(12) United States Patent
Yoshida et al.

(10) Patent No.: US 8,592,048 B2
(45) Date of Patent: Nov. 26, 2013

(54) RESIN COMPOSITION, MULTILAYER STRUCTURE USING SAME AND METHOD FOR PRODUCING SAME

(75) Inventors: Tomonori Yoshida, Osaka (JP); Kouji Yamada, Osaka (JP)

(73) Assignee: The Nippon Synthetic Chemical Industry Co., Ltd., Osaka (JP)

(*) Notice: Subject to any disclaimer, the term of this patent is extended or adjusted under 35 U.S.C. 154(b) by 0 days.

(21) Appl. No.: 13/362,686

(22) Filed: Jan. 31, 2012

(65) Prior Publication Data

US 2012/0128961 A1    May 24, 2012

Related U.S. Application Data

(63) Continuation of application No. PCT/JP2010/064789, filed on Aug. 31, 2010.

(30) Foreign Application Priority Data

Sep. 1, 2009   (JP) .................. 2009-201427
Mar. 31, 2010  (JP) .................. 2010-082627

(51) Int. Cl.
*B32B 27/32*   (2006.01)
*C04B 28/14*   (2006.01)

(52) U.S. Cl.
USPC ............ 428/521; 428/220; 524/423

(58) Field of Classification Search
None
See application file for complete search history.

(56) References Cited

U.S. PATENT DOCUMENTS

| | | | |
|---|---|---|---|
| 4,753,845 A * | 6/1988 | Sumi et al. | .......... 428/327 |
| 4,792,484 A | 12/1988 | Moritani | |
| 4,960,639 A | 10/1990 | Oda et al. | |
| 5,153,038 A | 10/1992 | Koyama et al. | |
| 5,202,052 A | 4/1993 | Zenner et al. | |
| 5,317,052 A | 5/1994 | Ohba et al. | |
| 5,439,745 A | 8/1995 | Ohba et al. | |
| 5,981,029 A | 11/1999 | Haeada et al. | |
| 6,083,605 A | 7/2000 | Harada et al. | |
| 8,039,114 B2 * | 10/2011 | Masumoto et al. | ........ 428/474.4 |
| 2005/0009987 A1 | 1/2005 | Hara et al. | |
| 2005/0065060 A1 * | 3/2005 | Kin et al. | ............ 510/506 |
| 2011/0135950 A1 | 6/2011 | Okamoto et al. | |

FOREIGN PATENT DOCUMENTS

| | | |
|---|---|---|
| CN | 1572829 A | 2/2005 |
| EP | 0331072 | 9/1989 |
| EP | 0367835 | 5/1990 |
| JP | 63-113062 | 5/1988 |
| JP | 64-69653 | 3/1989 |
| JP | 8-502770 | 3/1996 |
| JP | 5-140407 | 6/1996 |
| JP | 10-7824 | 1/1998 |
| JP | 2002-338773 | 11/2002 |
| JP | 2003-105155 A | 4/2003 |
| JP | 2004-18806 | 1/2004 |
| JP | 2004-035833 | 2/2004 |
| JP | 2008-56776 A | 3/2008 |
| WO | 94/09084 | 4/1994 |

OTHER PUBLICATIONS

Search report from International Application No. PCT/JP2010/064789, mail date is Nov. 2, 2010.
Search report from E.P.O., mail date is Jul. 1, 2013.

* cited by examiner

*Primary Examiner* — Sheeba Ahmed
(74) *Attorney, Agent, or Firm* — Greenblum & Bernstein, P.L.C.

(57) ABSTRACT

Disclosed is a resin composition comprising (A) a saponified ethylene-vinyl ester copolymer and (B) a completely or partially dehydrated polyvalent metal sulfate hydrate. Preferably, the component (B) is a completely or partially dehydrated 2-valent metal sulfate hydrate. The resin composition can suppress increasing viscosity in preparation thereof as well as production of the multilayer structure therefrom. A molded article can be stably produced and recover quickly gas barrier property deteriorated by hot water treatment and additionally maintain the superior gas barrier property.

13 Claims, No Drawings

RESIN COMPOSITION, MULTILAYER STRUCTURE USING SAME AND METHOD FOR PRODUCING SAME

CLAIM FOR PRIORITY

This application is a Continuation of International Application PCT/JP2010/064789, filed Aug. 31, 2010, the contents of which is expressly incorporated by reference in its entirety.

TECHNICAL FIELD

The present invention relates to a saponified ethylene-vinyl ester copolymer (hereinafter, sometimes referred to as "EVOH resin") composition excellent in moldability, and retaining gas barrier property after being subjected to hot water for a long time, and to a multilayer structure using the same. More specifically, it relates to a resin composition improved in melt-kneading performance with retaining gas barrier property of EVOH resin, and to a method for producing a melt-molded article using the same.

BACKGROUND ART

A saponified ethylene-vinyl ester copolymer (EVOH resin) is used as a packaging film for foods and so on due to superior oxygen-barrier property. However, if the EVOH resin film is subjected to hot water treatment e.g. to retort treatment for a long time, particularly, the gas barrier property immediately after the hot water treatment may be lowered, the film may be whitened, or the shape retainability may be lowered.

A resin composition in which a desiccant is added to EVOH resin is known as a resin composition capable of obtaining a packaging film having excellent gas barrier property even after hot water treatment. For instance, U.S. Pat. No. 4,792,484 discloses a laminate film, wherein a resin composition obtained by dispersing fine particles of phosphate such as sodium phosphate as a desiccant in EVOH resin is used for an intermediate layer, and the intermediate layer is held between thermoplastic resin (e.g. polyethylene, polypropylene, or polyvinyl chloride) films. In the laminate film, the desiccant can absorb moisture intruded from film ends, or moisture transmitted through the thermoplastic resin film as an outer layer, and thereby the gas barrier property of EVOH resin can be prevented from lowering due to moisture.

Further, JP Sho 63-113062A discloses dispersing desiccant particles in an EVOH resin matrix in particulate state having an intended particle range. Examples of the desiccant include salts which absorb moisture in the form of crystallization water, hygroscopic compounds, and superabsorbent polymers. The publication describes a most preferred salt which absorbs moisture in the form of crystallization water is phosphate (anhydrous) such as monosodium phosphate, and other preferred examples of salts include sodium borate and sodium sulfate (see upper right column, page 3). The publication discloses an effect (gas barrier property) obtained, in the case where sodium pyrophosphate anhydrous, trisodium phosphate anhydrous, monosodium phosphate anhydrous, monosodium phosphate anhydrous, trilithium phosphate anhydrous, sodium borate anhydrous, sodium sulfate anhydrous, sodium nitrate, sodium chloride, or sugar is used as a desiccant. The publication describes that use of phosphate particularly shows excellent gas barrier property even after retort treatment for 120 minutes.

[Patent document 1] U.S. Pat. No. 4,792,484A
[Patent document 2] JP Sho63-113062A

DISCLOSURE OF THE INVENTION

Technical Problem to be Solved by the Invention

In the case where a multilayer structure is industrially manufactured by continuous melt-molding, normally, a molded product is obtained by melt-mixing resin composition pellets in a melt-molding machine, followed by extrusion and molding. The viscosity of EVOH resin, as one of thermoplastic resins, may be relatively increased in melt-mixing, depending on the type of added desiccant. Such a viscosity increase in mixing may cause stagnation of resin in the extruder. If the resin stagnating in the extruder is immediately discharged, the stagnation does not cause a serious problem. However, in the case where a resin having a property that the viscosity thereof tends to increase resulting from heat with time is melt-molded, the stagnated resin may further increase the viscosity, which may further obstruct the discharging, and produce foreign matter resulting from heat deterioration.

In view of the above, an object of the invention is to provide a multilayer structure having excellent gas barrier property even after hot water treatment such as boiling treatment or retort treatment, and to provide a resin composition capable of suppressing a viscosity increase in melt-mixing.

Means for Solving the Problems

The present inventors intensely studied about a hydrate-formable salt and have completed the invention.

A resin composition of the invention comprises (A) a saponified ethylene-vinyl ester copolymer, and (B) a completely or partially dehydrated polyvalent metal sulfate hydrate. Preferably, the component (B) is completely or partially dehydrated 2-valent metal sulfate hydrate.

The (B) completely or partially dehydrated polyvalent metal sulfate hydrate absorbs moisture contained in the composition to become a hydrate, and thereby keeping the (A) saponified ethylene-vinyl ester copolymer dry in the resin composition, and as a result, the (A) saponified ethylene-vinyl ester copolymer can retain excellent gas barrier property. The component (B) after moisture absorption can be present in a stable state of polyvalent metal sulfate hydrate in the resin composition.

A content ratio (B/A) of the component (B) to the (A) saponified ethylene-vinyl ester copolymer (A) is preferably from 50/50 to 1/99 in terms of weight ratio wherein the weight of the component (B) is that of the completely dehydrated compound. Preferably, the resin composition further comprises a polyamide-based resin, preferably terminal-modified polyamide-based resin, in an amount of 1 to 30% by weight relative to the saponified ethylene-vinyl ester-based copolymer. Additionally, a plate-like inorganic filler is preferably contained in the resin composition of the invention.

A multilayer structure of the invention comprises at least one layer containing the resin composition of the invention. In a preferable embodiment of the multilayer structure, the layer containing the inventive resin composition is comprised as an intermediate layer, and layers containing a hydrophobic resin are provided on both outer sides of the intermediate layer. Preferably, the multilayer structure has a thickness in the range of 10 to 5000 μm. Such multilayer structure can be suitably used as a packaging material being subjected to hot water treatment.

The method for producing pellets of the resin composition of the invention comprises a step of melting and mixing (A) a saponified ethylene-vinyl ester copolymer with (B) a completely or partially dehydrated polyvalent metal sulfate hydrate.

A method for producing a melt-molded article of the resin composition of the invention is characterized by melting the resin composition comprising (A) a saponified ethylene-vinyl ester copolymer and (B) a completely or partially dehydrated polyvalent metal sulfate hydrate, and forming into a molded article of the resin composition.

Effect of the Invention

With respect to the (B) completely or partially dehydrated polyvalent metal sulfate hydrate, a saturated hydrate may exist more stably at normal temperature. Accordingly, when the completely or partially dehydrated polyvalent metal sulfate hydrate is contained in the resin composition, the completely or partially dehydrated polyvalent metal sulfate hydrate absorbs moisture to convert a hydrate form in the resin composition, thereby suppressing lowering of the gas barrier property of EVOH resin caused by incursion of water.

Moreover, in the case that the (B) completely or partially dehydrated polyvalent metal sulfate hydrate is added and melt-kneaded with EVOH resin, the melt viscosity of the resulting mixture is decreased, which is an advantageous feature given by addition of the component (B). Because it is contrary to the general phenomenon with gradual increase in the melt viscosity in melt-kneading EVOH resin alone.

The gradual increase in the melt viscosity during melt-kneading EVOH resin is caused by dehydration or crosslinking reaction of EVOH resin by heating. On the other hand, in the resin composition of the invention, it is supposed that the EVOH resin is decomposed to lower molecular weight thereof, and the crosslinking reaction of EVOH resin is inhibited, and as a result, the melt viscosity of the EVOH resin is decreased. This phenomenon is presumed that the metal of the component (B) might act as a catalyst of the crosslinking reaction or lead the pH of the melted resin composition to alkaline.

Viscosity increase in melt-mixing a resin composition causes stagnation of resin in a melt-molding machine. In the case where the resin stagnating in the melt-molding machine is immediately discharged, the stagnation does not cause a serious problem. However, in the case where a resin having a property that the viscosity thereof tends to increase resulting from heat with time is melt-molded, the viscosity of the stagnated resin further increases, which may further obstruct the discharging, and produce foreign matter by heat deterioration. The foreign matter may be intruded into a molded product, or may make it difficult to clean a resin passage in the melt-molding machine. Thus, generation of foreign matter may deteriorate the processability, or vary the quality of molded products. In view of the above, including the component (B) is advantageous not only in suppressing lowering of gas barrier property due to moisture absorption, but also in stabilizing the viscosity in melt-molding, and improving melt moldability.

The inventive resin composition is advantageous in suppressing a viscosity increase, generation of foreign matter by heat deterioration, and stably manufacturing pellets and a multilayer structure therefrom. Further, the inventive resin composition is advantageous in making the recovery speed of gas barrier property high and keeping excellent gas barrier property even after hot water treatment.

BEST MODE FOR CARRYING OUT OF THE INVENTION

The following will explain the constitution of the invention but merely show examples (typical examples), and the invention should not be construed as being limited to the examples.

First, the resin composition of the invention will be explained.

<EVOH Resin Composition>

The resin composition of the present invention comprises (A) a saponified ethylene-vinyl ester copolymer (EVOH resin) and (B) a completely or partially dehydrated polyvalent metal sulfate hydrate.

[(A) EVOH Resin]

EVOH resin used in the invention is a water-insoluble thermoplastic resin. A typical EVOH resin is a resin obtainable by copolymerizing ethylene and vinyl ester, and then saponifying the resulting ethylene-vinyl ester copolymer. An EVOH resin generally known as a film material for packaging food may be used. As the vinyl ester, vinyl acetate is typically used. Copolymerization of ethylene and vinyl ester may be carried out by any known polymerization method, for instance, solution polymerization, suspension polymerization, and emulsion polymerization. Also, saponification of the resulting ethylene-vinyl ester copolymer may be carried out by any known method. Thus obtained EVOH resin contains ethylene structural unit and vinyl alcohol structural unit as main units, and further contains small amount of vinyl ester structural unit as a remained unsaponified unit. A known polymerization method including solution polymerization method may be employed for copolymerization of ethylene and vinyl ester.

Although vinyl acetate is typically used as a vinyl ester, other kinds of vinyl ester may be used. Examples of the other kinds of vinyl ester are aliphatic vinyl esters such as vinyl formate, vinyl propionate, vinyl valerate, vinyl butyrate, vinyl isobutyrate, vinyl pivalate, vinyl caprate, vinyl laurate, vinyl stearate, vinyl versatate; and aromatic vinyl esters such as vinyl benzonate. Of these, an aliphatic vinyl ester having usually from 3 to 20 carbon atoms, preferably from 4 to 10 carbon atoms, and particularly preferably from 4 to 7 carbon atoms, may by used. Vinyl ester exemplified above may be usually used alone, or plural kinds of vinyl esters may be used together according to needs.

The content of ethylene structural unit of the EVOH resin used in the invention is usually from 20 to 60 mol %, preferably from 25 to 50 mol %, particularly from 27 to 48 mol %, as a value measured based on ISO14663. When the content is unduly low, the gas barrier property and melt-formability under high humidity condition tend to be lowered. On the other hand, when the content is unduly high, the gas barrier property tends to be insufficient.

The degree of saponification of vinyl ester in the EVOH resin is usually from 80 to 100 mol %, preferably from 90 to 100 mol %, particularly preferably from 95 to 100 mol %, as a value measured based on JIS K6726 (however, in a solution where EVOH resin is homogeneously dissolved in a water/methanol solvent). When the degree of saponification is unduly low, the gas barrier property, thermal stability, humidity resistance and the like performances tend to be lowered.

The melt flow rate (MFR) (210° C., load of 2,160 g) of the EVOH resin is usually from 0.5 to 100 g/10 min, preferably from 1 to 50 g/10 min, particularly preferably from 2 to 35 g/10 min. When the MFR is unduly high, film formability tends to be unstable. When the MFR is unduly low, the viscosity is too large, and thus melt molding tends to be difficult.

An ethylenical unsaturated monomer may be copolymerized in the EVOH resin used as the component (A), within the range where the advantages of the invention are not inhibited, for example, 10 mol % or less. The ethylenical unsaturated monomer includes olefins such as propylene, 1-butene, isobutene and so on; hydroxyl group-containing α-olefins such as 3-buten-1-ol, 4-penten-1-ol, 5-hexene-1,2-diol or ester thereof, acyl thereof, and the like derivatives; an unsaturated acid such as acrylic acid, methacrylic acid, crotonic acid, phthalic acid (anhydride), maleic acid (anhydride), itaconic acid (anhydride), or salt thereof, mono- or di(alkyl having 1 to 18 carbon atoms) ester; acrylamides such as acrylamide, N-(alkyl having 1 to 18 carbon atoms) acrylamide, N,N-dimethylacrylamide, 2-acrylamidopropanesulfonic acid, or salt thereof, acrylamidopropyldimethylamine or salt thereof, or quaternary salt thereof; methacrylamides such as methacrylamide, N-(alkyl having 1 to 18 carbon atoms)methacrylamide, N,N-dimethylmethacrylamide, 2-methacrylamidopropanesulfonic acid or salt thereof, methacrylamidopropyldimethylamine or salt thereof, or quaternary salt thereof, N-vinylamides such as N-vinylpyrrolidone, N-vinylformamide, N-vinylacetoamide; vinyl cyanides such as acrylonitrile and methacrylonitrile; vinyl ethers such as (alkyl having 1 to 18 carbon atoms) vinyl ether, hydroxyalkyl vinyl ether, and alkoxyalkyl vinyl ether; halogenated vinyl compounds such as vinyl chloride, vinylidene chloride, vinyl fluoride, vinylidene fluoride, and vinyl bromide; vinylsilanes such as trimethoxyvinylsilane; halogenated allyl compounds such as allyl acetate, and allyl chloride; allyl alcohols such as allyl alcohol and dimethoxyallyl alcohol; trimethyl-(3-acrylaraido-3-climethylpropyl)-ammonium chloride, and acrylamido-2-methylpropane-sulfonic acid and so on.

In particular, EVOH resin in which a hydroxyl group-containing α-olefin is copolymerized is preferable in view of good melt-formability and EVOH resin having 1,2-diol at a side chain is particularly preferable.

The EVOH resin having 1,2-diol at a side chain has the following structural unit (1).

[formula 1]

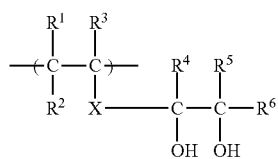

(1)

In the formula (1), $R^1$, $R^2$, and $R^3$ each independently represents a hydrogen or an organic group, X represents a single bond or a binding chain, and $R^4$, $R^5$, and $R^6$ each independently represents a hydrogen or an organic group.

The organic group used for $R^1$ to $R^6$ is not particularly limited, and examples of the organic group are saturated hydrocarbon groups such as methyl, ethyl, n-propyl, isopropyl, n-butyl, isobutyl, and tert-butyl; aromatic hydrocarbon groups such as phenyl, benzyl; halogen atoms, hydroxyl groups, acyloxy groups, alkoxy carbonyl groups, carboxyl groups, sulfonic acid groups, and the like.

$R^1$ to $R^6$ are each preferably a hydrogen or a saturated hydrocarbon group having usually from 1 to 30 carbon atoms, particularly from 1 to 15 carbon atoms, further from 1 to 4 carbon atoms. Hydrogen is most preferred. Accordingly, most preferred structural unit is a unit represented by the formula (1) wherein every $R^1$ to $R^6$ is hydrogen.

Moreover, X in the general formula (1) is typically a single bond. Accordingly, most preferable 1,2-diol structural unit represented by the formula (1) is a structure where all of $R^1$ to $R^6$ are hydrogens, and X is a single bond, that is, the structural unit represented by the formula (1a).

[formula 1a]

(1a)

Alternatively, a binding chain may be adopted in X in the formula (1) within the range where the advantages of the invention are not inhibited. Such binding chain includes hydrocarbon chains such as alkylene, alkenylene, alkynylene, phenylene, and naphthylene (these hydrocarbons may be substituted with a halogen such as fluorine, chlorine, bromine etc.) as well as structures containing ether linkage such as —O—, —(CH$_2$O)$_m$—, —(OCH$_2$)$_m$—, —(CH$_2$O)$_m$CH$_2$— etc.; structures containing a carbonyl group such as —CO—, —COCO—, —CO(CH$_2$)$_m$CO—, —CO(C$_6$H$_4$)CO— etc.; structures containing hetero atom such as sulfur-containing structure (e.g. —S—, —CS—, —SO—, —SO$_2$— etc.), nitrogen-containing structure (e.g. —NR—, —CONR—, —NRCO—, —CSNR—, —NRCS—, —NRNR— etc.), phosphorus-containing structure (e.g. —HPO$_4$— etc.); structures containing metal atom such as silicon-containing structure (e.g. —Si(OR)$_2$—, —OSi(OR)$_2$—, —OSi(OR)$_2$O— etc.), titanium-containing structure (e.g. —Ti(OR)$_2$—, —OTi(OR)$_2$—, —OTi(OR)$_2$O— etc.), aluminum-containing structure (e.g. —Al(OR)—, —OAl(OR)—, —OAl(OR)O— etc.) wherein R independently is hydrogen or an arbitrary substituent including an alkyl group, and m is natural number (usually from 1 to 30, preferably from 1 to 15, more preferably from 1 to 10). Among these binding chains, in view of stability at production and use, —CH$_2$OCH$_2$— and a hydrocarbon chain having a carbon number of 1 to 10 are preferred, and furthermore, a hydrocarbon chain having a carbon number of 1 to 6, particularly 1 is preferred.

The resin composition of the invention comprises (A) an EVOH resin as a base resin. The content of the EVOH resin (A) in the resin composition is in the range of usually 50 to 99% by weight, preferably 60 to 95% by weight, particularly preferably 70 to 90% by weight based on the total weight of the resin composition. When the content of EVOH resin is unduly low, gas barrier property tends to be insufficient.

[(B) Completely or Partially Dehydrated Polyvalent Metal Sulfate Hydrate]

(B) a completely or partially dehydrated polyvalent metal sulfate hydrate used in the invention is a composite obtainable by drying and dehydrating polyvalent metal sulfate hydrate, and has a property incorporating water molecules as crystallization water therein. A polyvalent metal sulfate hydrate is usually solid at normal temperature and pressure.

The component (B) is represented by Mm(SO$_4$)n.xH$_2$O, wherein M is a polyvalent metal, preferably 2-valent or 3-valent metal, more preferably 2-valent metal, further more preferably alkaline earth metal, most preferably magnesium, and m is preferably 1 or 2, and n=1 in the case of m=1, and n=3 in the case of m=2. In the component (B), x is a positive number smaller than the number of the corresponding saturated hydrate, depending on the species of metal M. The compound having x of 0 corresponds to anhydrous, namely, a completely dehydrated compound.

Specifically, the M of 2-valent metal formable the aforementioned metal salt includes alkaline earth metals such as beryllium (beryllium sulfate ($BeSO_4.4H_2O$)), magnesium (magnesium sulfate ($MgSO_4.7H_2O$)), and calcium (calcium sulfate ($C_aSO_4.2H_2O$)), as well as transition metals convertible 2-valent ion such as copper (copper sulfate ($CuSO_4.5H_2O$)), zinc (zinc sulfate ($ZnSO_4.7H_2O$)), and iron (iron sulfate ($FeSO_4.7H_2O$)). The M of 3-valent metal includes aluminum (aluminum sulfate ($Al_2(SO_4)_3.16H_2O$)), and iron. The metal salt hydrates in above parentheses represent the saturated hydrates of the respective metal.

For instance, calcium sulfate is known to exist as semi-hydrate (x=½), dihydrate (x=2), and so on, and the semi-hydrate is easy to convert dihydrate due to moisture absorption. Accordingly, a completely or partially dehydrated calcium sulfate hydrate is a compound having x less than 2.

As for ferrous sulfate, since heptahydrate thereof can stably exist under wet condition, a compound having x<7 or dehydrated product of heptahydrate is preferable. As for ferric sulfate, since hexa- or hepta-hydrate thereof can stably exist, a compound having x<7 or dehydrated product of these hydrates is preferable.

As for copper sulfate, since pentahydrate can stably exist, completely dehydrated compound (x=0) or partially dehydrated compound (x<5) has hygroscopic properties. Accordingly, a dehydrated copper sulfate hydrate has preferably x less than 5.

As for magnesium sulfate, hexahydrate, heptahydrate and so on can stably exist at normal temperature. Accordingly, a dehydrated magnesium sulfate hydrate has x less than 7, more preferably less than 6, further more preferably less than 1, and most preferred is anhydrous (x=0).

Partially dehydrated polyvalent metal sulfate hydrate to be used as the component (B) can be obtained by partially removing crystallization water from the aforementioned saturated hydrate. Normally, assuming that the amount of crystallization water in saturated hydrate of polyvalent metal sulfate is 100% by weight, a partially dehydrated polyvalent metal sulfate hydrate contains crystallization water in the amount of less than 90%. It is preferable that a saturated hydrate stays more stably than a partially dehydrated product thereof at normal temperature. In view of this, it is preferable to employ a partially dehydrated product having crystallization water in an amount of reduced down to less than 70%, and more preferable to employ completely dehydrated product.

The water content of the partially or completely dehydrated polyvalent metal sulfate hydrate as the component (B) is normally from 0 to 50 wt %, preferably from 0 to 40 wt %, and particularly preferably from 0 to 10 wt %, in the case of, e.g. completely or partially dehydrated magnesium sulfate, which are measured at 550° C., 30 min by a thermogravimetric analyzer (Perkin-Elmer thermogravimetric analyzer "Pyris 1 TGA"). In the specification, the water content as a measurement value is a ratio of moisture amount with respect to the weight of the corresponding compound, and is a value obtained by measuring an amount of change weight (moisture amount) after held at 550° C., 30 min, and calculating a ratio of the measured moisture amount to the weight of the compound at the time of measurement start.

In the case where the component (B) is a completely dehydrated compound (i.e. anhydrous), the moisture amount of the completely dehydrated compound is theoretically zero, and therefore, the water content is also 0 wt %. However, a value measured by the thermogravimetric analyzer may exceed 0 wt % resulting from e.g. moisture absorption. For instance, in the case where the component (B) is completely dehydrated magnesium sulfate (i.e. anhydrous), the value of the completely dehydrated magnesium sulfate measured by the thermogravimetric analyzer may range from about 0 to 10 wt %. It is conceived that the moisture absorption occurs because the moisture amount of the completely dehydrated magnesium sulfate is smaller than that of magnesium sulfate monohydrate (theoretically, the moisture amount of the monohydrate is 13 wt %). Even if the completely dehydrated product absorbs moisture, the measurement value by the thermogravimetric analyzer of the completely dehydrated product is preferably from 0 to 5 wt %.

The completely or partially dehydrated polyvalent metal sulfate hydrate as mentioned above can convert saturated hydrate of the polyvalent metal sulfate because the saturated hydrate is stable at normal temperature. Accordingly, in the case that anhydrous or partially dehydrated compound is contained in the resin composition, they can prevent incursion of water molecules into EVOH resin and/or capture the water molecule absorbed once in EVOH resin. Thus the component (B) contributes to suppress lowering of gas barrier property due to moisture absorption. The component (B) can capture water molecule enough to convert a stable saturated hydrate of the polyvalent metal sulfate. Accordingly, the greater amount of crystallization water for forming the saturated hydrate is, the more excellent drying ability the component (B) has.

Further, adding completely or partially dehydrated polyvalent metal sulfate hydrate as the component (B) to EVOH resin, and melt-mixing the resulting mixture is advantageous in reducing the melting viscosity. Specifically, a resin composition obtained by melt-mixing the EVOH resin (A) with the completely or partially dehydrated polyvalent metal sulfate hydrate (B) has a torque value (Nm) in melt-mixing with time as follows. For instance, 55 g pellets of the resin composition is put in a torque rheometer ("plasticorder PLE331" of Brabender, roller mixer: W50E) at 230° C., and preheated for 5 minutes, followed by melt-mixing at a rotation number of 50 rpm, and measuring torque value (Nm) with time. The ratio of torque values between 120 min after measurement start and 10 min after measurement start is normally from 0.1 to less than 1, and preferably from 0.2 to 0.5.

Such viscosity behavior of the resin composition of the invention is a specific effect owing to addition of the component (B), because the viscosity behavior is in contrast with that of EVOH resin alone whose melt viscosity is generally increased little by little during melt-kneading. Since the decrease of the melt viscosity is conceived to result from suppressing crosslinking or breaking down of EVOH resin, the viscosity behavior of the inventive resin composition is likely to be given by the increase of metal ion capable of leading the melted resin composition alkaline.

Viscosity increase in melt-molding a resin composition at an industrial scale introduces resin stagnating in a melt-molding machine (e.g., extruder or the like). In the case where the resin stagnating in the melt-molding machine is immediately discharged, the stagnation does not cause a serious problem. However, in the case where a resin having a property that the viscosity thereof tends to increase resulting from heat with time is melt-molded, the viscosity of the stagnated resin further increases, which may further obstruct the discharging, and produce foreign matter by heat deterioration. The foreign matter may be intruded into a molded product, or may make it difficult to clean a resin passage in the melt-molding machine. Thus, generation of foreign matter may deteriorate the processability, or vary the quality of the molded products. In view of the above, addition of the component (B) is advantageous not only in suppressing lowering of gas barrier property due to moisture absorption, but also in stabilizing the viscosity in melt-molding, and improving melt moldability.

The content of (B) a completely or partially dehydrated polyvalent metal sulfate hydrate is smaller than that of EVOH resin (A). Specifically, the weight ratio (B/A) of the component (B) to the EVOH resin (A) is usually in the range between (less than 50)/(more than 50) and 1/99, more preferably between 30/70 and 1/99, further more preferably between 20/80 and 5/95, particularly preferably between 15/85 and 5/95, wherein the amount of the component (B) is the weight of the completely dehydrated compound.

In other words, the amount of the (B) metal sulfate is preferably in the range of more than 1 parts by weight but less than 100 parts by weight, more preferably 1 to 43 parts by weight, further more preferably 5 to 25 parts by weight, particularly preferably 5 to 15 parts by weight, with respect to 100 parts by weight of EVOH resin (A).

If the content of the component (B) is unduly high, it is likely to lose transparency, and the mesh screen of the molding machine is likely to be blocked due to coagulation in molding. If the content of the component (B) is unduly low, removal of water from EVOH resin (A) is not enough for retaining sufficient gas barrier property still after hot water treatment such as boil treatment or retort treatment.

Furthermore, as for use of a completely or partially dehydrated polyvalent metal sulfate hydrate, the preferable polyvalent metal sulfate hydrate has crystallization water removable at a temperature of more than 100° C. In the case of a partially dehydrated metal salt having crystallization water easy to be dehydrated at a temperature less than 100° C., the crystallization water sometimes vaporizes upon heating to generate foams during melt-kneading with EVOH resin.

[(C) Other Thermoplastic Resin]

According to the invention, an EVOH resin composition may optionally comprise a thermoplastic resin (C) other than EVOH resin (hereinafter, the thermoplastic resin (C) is referred to as "other thermoplastic resin") in an amount of usually 30% by weight or less based on the weight of the component (A).

Examples of the component (C) or other thermoplastic resin are polyolefin-based resin, polystyrene-based resin, polyester, polyamide, copolymerized polyamide, polyvinyl chloride, polyvinylidene chloride, acryl-based resin, vinyl ester-based resin, polyester elastomer, polyurethane elastomer, chlorinated polyethylene, chlorinated polypropylene and so on. The polyolefin-based resin is widely defined and includes olefin homo- or copolymers such as linear low density polyethylene, low density polyethylene, middle density polyethylene, high density polyethylene, ethylene-vinyl acetate copolymer, ionomer, ethylene-propylene copolymer, ethylene-ester acrylate copolymer, polypropylene, propylene-(α-olefin having 4 to 20 carbon atoms) copolymer, polybutene, and polypentene; polycyclic olefins; and these olefin homo- or copolymer graft modified with an unsaturated carboxylic acid or ester thereof.

In the case that a multilayer structure made of the inventive resin composition is used for food packaging material, polyamide-based resin is particularly preferably used because the polyamide-based resin can prevent elution of EVOH resin layer at ends of the multilayer structure after hot water treatment. The polyamide-based resin can form a network structure by reaction of amide thereof to OH group and/or ester group of the EVOH resin, and thereby preventing elution of the EVOH resin caused by hot water treatment. In view of this, a preferable resin composition used as a packaging material for retort food or boil food comprises a polyamide-based resin.

As the polyamide-based resin, any known polyamide-based resin may be used.

The specific examples of the homopolymer type polyamide-based resins are polycapramide (nylon 6), poly-ω-aminoheptanoic acid (nylon 7), poly-ψ-aminononanoic acid (nylon 9), polyundecaneamide (nylon 11), and polylauryllactam (nylon 12). Examples of copolymer type polyamide-based resin are aliphatic polyamides such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), caprolactam/lauryllactam copolymer (nylon 6/12), caprolactam/ω-aminononanoic acid copolymer (nylon 6/9), caprolactam/hexamethylenediammonium adipate copolymer (nylon 6/66), lauryllactam/hexamethylenediammonium adipate copolymer (nylon 12/66), ethylene diamine adipamide/hexamethylenediammonium adipate copolymer (nylon 26/66), caprolactam/hexamethylenediammonium adipate/hexamethylenediammonium sebacate copolymer (nylon 66/610), ethyleneammonium adipate/hexamethylenediammonium adipate/hexamethylenediammonium sebacate copolymer (nylon 6/66/610); aromatic polyamides such as poly(hexamethylene isophthalamide), poly(hexamethylene terephthalamide), poly(m-xylylene adipamide), hexamethylene isophthalamide/terephthalamide copolymer, poly(p-phenylene terephthalamide), poly(p-phenylene-3-4'-diphenylether terephthalamide); amorphous polyamide; these polyamide-based resins modified with an aromatic amine such as methylenebenzylamine, m-xylenediamine and the like; m-xylylenediammonium adipate. Those polyamide-based resins may be modified at a terminal. The terminal-modified polyamide-based resin is preferred.

Examples of the terminal-modified polyamide-based resin include a polyamide-based resin terminal-modified with a hydrocarbon group having 1-22 carbon atoms. A commercially available terminal-modified polyamide-based resin may also be used. In more detail, a terminal-modified polyamide-based resin satisfying the following equation may be preferably used, wherein X represents the number of terminal COOH groups and Y represents the number of terminal $CONR_1R_2$ groups, wherein $R_1$ is a hydrocarbon group having from 1 to 22 carbon atoms and $R_2$ is hydrogen or a hydrocarbon groups having from 1 to 22 carbon atoms:

$$100 \times Y/(X+Y) \geq 5$$

The terminal-modified polyamide-based resin is a resin obtained by N-substituted amide-modifying a carboxyl group of conventional polyamide-based resin with a terminal modifier. The modification amount is 5% or more relative to the total amount of carboxyl groups contained in the polyamide-based resin before modification. If the modification amount is unduly low, many carboxyl groups still remain in the polyamide-based resin after modification and the carboxyl groups react with EVOH resin to produce gel or a like matter in melt molding, which results in a film with poor appearance. The terminal-modified polyamide-based resin is producible by the method disclosed in, for example, JP Hei08-19302B.

As the aforementioned terminal modifier, an amine reactable with carboxyl group is employed in order to reduce an amount of carboxyl groups remained in the polyamide-based resin after modification. Such amine may be mono- or di-substituted amine represented by $HNR_1R_2$. In the case of $R_2$ being hydrogen, the amine corresponds to a mono-substituted amine. In the case that $R_1$ and/or $R_2$ in $HNR_1R_2$ is an organic group, the organic group may be a hydrocarbon group without carboxyl group. As far as the gist of the invention is not inhibited, $R_1$ and $R_2$ each may contain the other functional group such as hydroxyl group, amino group, carbonyl group or the like. However, preferably, $R_1$ and $R_2$ each is an aliphatic hydrocarbon group, in particular, a hydrocarbon group having a carbon number of 1 to 22, preferably 5 to 20. $R_1$ and $R_2$ may be identical or different.

It is preferable that there are small amounts of unmodified terminal carboxyl groups in the terminal-modified polyamide-based resin. The amount of the unmodified terminal carboxyl groups may be a value (molar equivalent with respect to 1 g of polymer) obtained by dissolving polyamide resin in benzyl alcohol, and titrating with 0.1N sodium hydroxide aqueous solution. Normally, the value is in the range of 0 to 50 µeq/1 g polymer, preferably 0 to 30 µeq/1 g polymer, and particularly 0 to 25 µeq/1 g polymer. If the value is unduly large, a gel may be generated in forming a film, which may deteriorate the film appearance, and lower the retort properties. On the other hand, if the value is unduly small, the productivity tends to be lowered, although the film properties have no problem. In view of this, the presence of small amounts of carboxyl groups is not problematic. When the unmodified carboxyl groups are remained, the value is desirably set in the range of usually from 5 to 50 µeq/1 g polymer, preferably from 10 to 30 µeq/1 g polymer, particularly from 15 to 25 µeq/1 g polymer.

The terminal $NH_2$ group in the unmodified polyamide-based resin, as is similar to the case of terminal carboxyl group, is preferably modified with a hydrocarbon group having from 1 to 22 carbon atoms. Accordingly, in order to reduce an amount of amino group in the polyamide-based resin, a carboxylic acid reactable with amino group, specifically monocarboxylic acid represented by RCOOH (wherein R is a hydrocarbon group having from 1 to 22 carbon atoms) is preferably used as the terminal modifier for modification of the terminal $NH_2$ group.

A melting point of the terminal-modified polyamide-based resin is normally in the range of 200 to 250° C., and preferably 200 to 230° C.

When a polyamide-based resin is used as (C) other thermoplastic resin, an addition amount of the polyamide-based resin is normally selected from the range of 1 to 30% by weight, preferably 3 to 25% by weight, particularly preferably 5 to 15% by weight, relative to EVOH resin (A).

In the case that a resin such as polyamide-based resin that the viscosity increases when mixing with EVOH resin is used as the component (C), the resin composition comprising (B) completely or partially dehydrated polyvalent metal sulfate hydrate can suppress increasing viscosity during melt-kneading, and therefore it is possible to appropriately control the viscosity in melt molding, which results in securing superior melt-moldability.

For example, in the case of a resin composition comprising (A) an EVOH resin, (B) a completely or partially polyvalent metal sulfate hydrate, and a component (C) like a polyamide-based resin which increases the viscosity when mixing with EVOH resin, the resin composition has normally from 0.3 to 1, preferably from 0.5 to less than 1 in a ratio of the torque value (Nm) between 120 min after measurement start and 10 min after measurement start wherein the torque value (Nm) is measured as follows: the pellets obtained by melt-kneading the resin composition is charged in a torque rheometer ("plasticoder PLE331" of Brabender, roller mixer: W50E) set at 230° C., and preheated for 5 minutes, followed by melt-kneading at a rotation number of 50 rpm and measuring.

[(D) Plate-Like Inorganic Filler]

According to the invention, the EVOH resin composition may further contain plate-like inorganic filler, in addition to (A) an EVOH resin and (B) a completely or partially dehydrated polyvalent metal sulfate, and optionally (C) other thermoplastic resin.

Examples of the plate-like inorganic filler include kaolin, mica, and talc. Of these, kaolin is preferred. The kaolin is plate-like particle comprising aluminum silicate hydrate as a main component. The mica is a layered silicate mineral. Talc comprises magnesium hydroxide and silicate. Any species of kaolin may be used, and calcined kaolin is preferably used, but not limited thereto.

Adding the plate-like inorganic fillers further enhances the gas barrier property of resin composition. Since the plate-like inorganic filler has a layered structure, the (B) completely or partially dehydrated polyvalent metal sulfate hydrate could interpose between the layers of fillers during kneading, thereby preventing the fillers from being broken or fragmented by contact or collision. Further, in forming a film, the planar surface of the plate-like filler would be aligned with the plane direction of the film. Thus, the plate-like inorganic filler aligned in the plane direction of the film contributes to blocking oxygen from transmitting through the resin composition layer.

Adding amount of such plate-like inorganic filler is not limited, but usually selected from the range between 1 and 20% by weight, preferably between 3 and 20% by weight, more preferably between 5 and 15% by weight, based on the weight of EVOH resin (A).

[(E) Other Additives]

In addition to EVOH resin, metal salt sufate, other thermoplastic resin, and plate-like inorganic filler, the resin composition of the invention may contain known additives including plasticizer of aliphatic polyalcohol such as ethylene glycol, glycerin, hexanediol etc.; slipping agent such as saturated aliphatic amide (e.g. amide stearate etc.), unsaturated fatty acid amide (e.g. amide oleate etc.), bis fatty acid amide (e.g. ethylene amide bisstearate etc.), low molecular weight polyolefin (e.g. polyethylene or polypropylene each having a molecular weight of 500 to 10000 or so); antiblocking agent; antioxidant; colorant; antistatic agent; ultraviolet absorber; insecticide; filler (e.g. granular, needle-like inorganic filler except a plate-like one etc.); oxygen absorbent; surfactant, wax; dispersing agent (monoglyceride stearate, calcium stearate, magnesium stearate etc.), if desirable.

Such additives may be contained in an amount of usually not more than 10% by weight, preferably not more than 5% by weight, particularly from 0.1 to 3% by weight, relative to the total weight of the resin composition.

<Preparation of Resin Composition>

As described above, the resin composition of the invention comprises the component (A) and the component (B), optionally comprises the components (C), (D), and (E). Specific embodiments include a resin composition of the first embodiment comprising the components (A) and (B), and if necessary, the component (E); a resin composition of the second embodiment comprising the components (A), (B), and (C), and if necessary, the component (E); a resin composition of the third embodiment comprising the components (A), (B), and (D), if necessary, and the component (E); a resin composition comprising the components (A), (B), (C), and (D), if necessary, and the component (E).

The resin composition of the invention is prepared by mixing the component (A) with the component (B), and if desirably, with the component (C), (D) or (E). The mixing is usually performed by melt-kneading method or mechanical mixing method in which pellets are dry blended, preferably by melt-kneading method.

Viscosity reduction effect can be obtained not only when melt-kneading in the presence of magnesium sulfate but also when preparing the resin compositions of the aforementioned embodiments. The viscosity reduction effect enables to stably produce the resin composition having uniformity.

The order of blending in the melt-kneading method is as follows:

For instance, (1) blending simultaneously the components (A) and (B), and when necessary, the components (C)-(E); (2) adding the component (B) (and optionally the component (D)) to the melted component (A) (and optionally the component (C)), and then melt-kneading. The order of blending in the case of comprising the component (C) is as follows: (3) melt-kneading the component (B) with either of the component (A) or (C) (or (D) when optionally comprising), followed by melt-kneading the other component (C) or (A); and (4) preparing a component (B) masterbatch in advance where the component (A) (and/or (C)) and the highly concentrated component (B) (and optionally the component (D)) are contained, and then, adding the component (A) (and/or (C)) to the masterbatch for diluting the component (B). In the above order, the component (E) may be added at an arbitrary timing.

The machine used for melt-kneading is not limited and any known melt-kneading machine, for instance, kneader-ruder, mixing roll, banbury mixer, plasto mill, extruder or a like machine, may be used. As for an extruder, both single screw extruder and twin screw extruder may be usable, and if necessary, vent suction device, gear pump, screen and the like may be equipped thereto. The melt-kneading machine is normally set at a temperature between 150 and 300° C., preferably between 170 and 250° C.

In some cases, it is possible to adopt a preparation method by dipping the component (A) and/or component (C) in aqueous solution of the component (B) and drying. Such preparation as disclosed in, e.g. JP2000-136281A, wherein EVOH resin is immersed in aqueous solution of metal sulfate to prepare a EVOH resin composition containing the metal sulfate. However such preparation is apt to impair the hydrate formability of the metal sulfate and the metal sulfate cannot still maintain hydrate formability in the resin composition thus prepared. Accordingly, it is difficult to apply the preparation method because the metal sulfate as the component (B) is required to maintain its hydrate formability after molding.

Furthermore, there may be some cases that a resin composition is prepared by mixing the component (A) and/or component (C) with saturated hydrate as the component (B), and melt-kneading at such a high temperature that the components (A) and (C) can be melted and water contained in the saturated hydrate can be vaporized. However, this preparation method is difficult to be employed, because gas bubbles are likely to generate in preparing the resin composition.

<Molded Article>

The resin composition of the invention is formed into film, sheet, cup, bottle and so on by melt-molding method. The resin composition of the invention immediately after melt-kneading may be directly formed into a molded article. Preferably, in view of industrial treatment, preparing pellets of the resin composition after melt-kneading, and feeding the pellets to produce a molded article. In an economic point, the pellets are preferably obtained by melt-kneading and extruding in the form of strand with an extruder, and cutting the strand.

The melt-molding method includes extrusion molding method (T-die cast film extrusion, extruding lay-flat film, extrusion blowing, melt spinning, contour extrusion, etc.), injection molding and the like. The melt-molding temperature is normally selected from the range between 150 and 300° C.

The viscosity reducing effect in melt-kneading the inventive resin composition can contribute to prevent generation of foreign matter by heat deterioration in melt molding, and to obtain a molded article having high uniformity. Due to this, the melt-molding method is particularly preferably employed.

Also, even if a resin, e.g. polyamide-based resin, having a property that the viscosity thereof tends to increase comparing with EVOH resin alone is mixed with EVOH resin, blending the component (B) makes it possible to stabilize viscosity of the resin composition in melt molding.

A molded article made of the inventive resin composition may be usable for a variety of applications as it is. In applications, the resin composition layer has a thickness of usually 1 to 5000 µm, preferably 5 to 4000 µm, particularly preferably 10 to 3000 µm.

A typical layer of the resin composition comprises the component (A) and the component (B), and may be a layer of the resin composition prepared as an aforementioned method, and may be formed by an aforementioned melt molding. In the molded article thus obtained, the component (B) is normally present in a state of dispersing in the component (A) as a base resin.

<Multilayer Structure>

A multilayer structure of the invention comprises at least one layer of the resin composition of the invention. The layer comprising the inventive resin composition, which is simply referred to as "resin composition layer", may be laminated on other substrate to improve strength thereof or impart other properties.

Regarding other substrate, a thermoplastic resin other than EVOH resin, which is referred to as "other thermoplastic resin", is preferably used.

As a layer structure of the multilayer structure, when the resin composition layer is referred to as a (a1, a2, . . . ), and other thermoplastic resin layer is referred to as b (b1, b2, . . . ), arbitrary combinations such as a/b, b/a/b, a/b/a, a1/a2/b, a/b1/b2, b2/b1/a/b1/b2, and b2/b1/a/b1/a/b1/b2 are possible. When a recycled layer comprising a mixture of a thermoplastic resin and the inventive resin composition is referred to as R, combinations such as b/R/a, b/R/a/b, b/R/a/R/b, b/a/R/a/b, and b/R/a/R/a/R/b are also possible. The recycled layer is obtained by re-melt molding ends or wastes generated in production of the inventive multilayer structure. Total number of layers of the multilayer structure is usually selected from the range between 2 and 15, preferably 3 and 10.

In the above-mentioned layer structure, if desirable, an adhesive resin layer may be intervened each between layers.

It is particularly preferable to use, among the aforementioned multilayer structures, a multilayer structure which includes the inventive resin composition layer as an intermediate layer, and at least includes a multilayer structural unit (b/a/b, or b/adhesive resin layer/a/adhesive resin layer/b) having the other thermoplastic resin layer, as layers for sandwiching the intermediate layer. In the multilayer structure having the inventive resin composition layer as a sandwiched layer, use of a hydrophobic resin for at least one layer (the other thermoplastic resin layer b or the adhesive resin layer) located at both outer sides of the inventive resin composition layer is more advantageous in obtaining the drying effect by the component (B), because the hydrophobic resin prevents moisture absorption from the outside. Thus, in manufacturing a multilayer structure for a packaging material which is used by being subjected to hot water treatment, use of a hydrophobic resin for at least one layer located at both outer sides of the inventive resin composition layer, as the multilayer structural unit, is advantageous in making the recovery speed of oxygen blocking performance high after hot water treatment.

Examples of the "other thermoplastic resin" are, for instance, widely meaning polyolefin-based resin including not only unmodified olefin-based resin but also unsaturated carboxylic acid graft-modified olefin-based resin; ionomer, ethylene-vinyl acetate copolymer, ethylene-acrylate copolymer, ethylene-acrylate copolymer, polyester-based resin, polyamide-based resin (including a copolymerized polyamide), polyvinyl chloride, polyvinylidene chloride, acryl-based resin, polystyrene, vinyl ester-based resin, polyester elastomer, polyurethane elastomer, halogenated polyolefin such as chlorinated polyethylene, chlorinated polypropylene, aromatic- or aliphatic polyketone. The unmodified olefin-based resin include polyethylene-based resin such as linear low density polyethylene, low density polyethylene, ultra low density polyethylene, middle density polyethylene, high density polyethylene, ethylene-propylene block- or random-copolymer, ethylene-α-olefin copolymer (wherein the α-olefin has from 4 to 20 carbon atoms); polypropylene-based resin such as polypropylene, propylene-α-olefin copolymer (wherein the α-olefin has from 4 to 20 carbon atoms); polybutene, polypentene, polycyclic olefin-based resin (which has a cyclic olefin structure in main chain and/or side chain thereof). The unsaturated carboxylic acid graft-modified olefin-based resin is a resin obtainable by modifying the olefin-based resin with an unsaturated carboxylic acid or ester thereof.

Among them, a hydrophobic resin including polyamide-based resin, polyolefin-based resin, polyester-based resin, and polystyrene-based resin is preferably used, and polyolefin-based resin including polyethylene-based resin, polypropylene-based resin, polycyclic olefin-based resin and their unsaturated carboxylic acid-modified polyolefin-based resin is more preferably used, and polycyclic olefin-based resin is particularly preferably used.

Any known adhesive resin can be used as an adhesive resin. The adhesive resin is appropriately selected according to a type of other thermoplastic resin "b" used for the substrate. Typical adhesive resin is a carboxyl group-modified polyolefin-based polymer obtainable by chemically binding of an unsaturated carboxylic acid or anhydride thereof to a polyolefin-based resin through an addition reaction or graft reaction or the like, for instance, maleic anhydride graft-modified polyethylene, maleic anhydride graft-modified polypropylene, maleic anhydride graft-modified ethylene-propylene (block- or random-) copolymer, maleic anhydride graft-modified ethylene-ethyl acrylate copolymer, maleic anhydride graft-modified ethylene-vinyl acetate copolymer, maleic anhydride graft-modified polycyclic olefin-based resin, maleic anhydride graft-modified polyolefin-based resin. These may be used alone or in a combination of two or more thereof.

In the case that a multilayer structure of the invention comprises an adhesive resin layer between a resin composition layer and an other thermoplastic resin layer, the adhesive resin having high hydrophobicity is preferably used because the adhesive resin layer is present as at least one layer of both outer sides of the resin composition layer.

A known polycyclic olefin-based resin (e.g. a resin disclosed in JP2003-103718A, JP Hei05-177776A, JP2003-504523A etc.) may be used as the aforementioned polycyclic olefin-based resin. A polycyclic olefin-based resin has lower humidity permeability than a linear aliphatic polyolefin such as polycyclic olefin-based resin, polyethylene, polypropylene, and the like. And therefore, in the case of a multilayer structure where the layer of the inventive resin composition is present as an intermediate layer sandwiched by other thermoplastic resin layers and/or adhesive resin layers. It is possible to reduce incursion of water from outside due to air humidity or hot water treatment by using the polycyclic olefin-based resin for the other thermoplastic resin layer or adhesive resin layer. As a result, the component (B) can successfully exhibit drying effect in the resin composition layer, and recovery of oxygen permeability of the multilayer structure can be obtained immediately after hot water treatment.

The substrate resin and adhesive resin may contain a known additive such as plasticizer, filler, clay (e.g. montmorillonite etc.), colorant, antioxidant, antistatic agent, slipping agent, nucleating agent, antiblocking agent, ultraviolet absorber, wax and so on, within a range where advantages of the invention is not impaired, for example, in an amount of not more than 30% by weight, preferably not more than 10% by weight.

Regarding lamination of laminating the resin composition of the invention on other substrate (including lamination via adhesive resin layer), any known laminating method can be adopted. For example, a method of melt-extruding other substrate on a film or sheet of the resin composition; a method of melt-extruding the resin composition on other substrate; a method of co-extruding the resin composition and other substrate; a method of dry laminating the resin composition (layer) and other substrate (layer) using a known adhesive such as organic titanium compound, isocyanate compound, polyester-based compound, and polyurethane compound; and a method coating the resin composition solution on other substrate and then removing the solvent. Of these methods, the method of co-extruding is preferred in the view of cost and environment.

Thus obtained multilayer structure, if desirable, may be subsequently subjected to apply a (heat) stretching treatment. The stretching treatment may be either uniaxial stretching or biaxial stretching, in the case of biaxial stretching, it may be simultaneous stretching or sequential stretching. As the stretching treatment, a method of high stretching magnification can be adopted among roll stretching, tenter stretching, tubular stretching, stretch blow molding method, and vacuum-pressure forming. The stretching temperature is selected from the range of usually 40 to 170° C., preferably 60 to 160° C., as the amibient temperature of the multilayer structure. When the stretching temperature is too low, stretching ability becomes poor. When the stretching temperature is too high, it becomes difficult to maintain a stable stretched state.

For this purpose of imparting dimensional stability after stretching, thermal setting may be subsequently performed. The thermal setting is a well-known method and is practicable. For example, the above stretched film is subjected to a heat treatment usually at from 80 to 180° C., preferably from 100 to 165° C., usually for 2 to 600 seconds with keeping the film under the stretched state.

The thicknesses of the multilayer structure (including stretched one), the resin composition layer, other thermoplastic resin layer and adhesive resin layer vary depending on layer combination, types of thermoplastic resin and adhesive resin, use, packaging style, and required properties and so on. Typically, the thickness of the multilayer structure is usually selected from the range of 10 to 5000 μm, preferably 30 to 3000 μm, particularly preferably 50 to 2000 μm. The thickness of the resin composition layer is selected from the range of 1 to 500 μm, preferably 3 to 300 μm, particularly preferably 5 to 200 μm. The thickness of other thermoplastic resin layer is usually selected from the range of 5 to 30000 μm, preferably 10 to 20000 μm, particularly preferably 20 to 10000 μm, and the thickness of the adhesive resin layer is usually selected from the range of 0.5 to 250 μm, preferably 1 to 150 μm, particularly preferably 3 to 100 μm.

Moreover, the thickness ratio of resin composition layer to other thermoplastic resin layer, i.e. resin composition layer/thermoplastic resin layer, in the multilayer structure, is usually from 1/99 to 50/50, preferably 10/90 to 45/55, particularly 20/80 to 40/60, as a ratio of the thickest layer to the thickest layer when plural layers are present as each kind of layers. The thickness ratio of resin composition layer to adhesive resin layer, i.e. resin composition layer/adhesive resin layer, in the multilayer structure, is usually from 10/90 to 99/1, preferably 20/80 to 95/5, particularly preferably 50/50 to 90/10, as a ratio of the thickest layer to the thickest layer when plural layers are present as each kind of layers.

A bag, cover, and container including cups, trays, tubes, and bottles, made of film, sheet, or stretched film produced in the manner as described above are useful for packaging containers for common foods, seasonings such as mayonnaise and dressing, fermented foods such as soy-bean paste, fat and oil foods such as salad oil, drinks, cosmetics, medicaments, and the like.

Since the layer of the inventive resin composition is excellent in gas barrier property after hot water treatment, the multilayer structure is particularly useful as a packaging material for foods to be subjected to hot water treatment.

Incidentally, in the multilayer structure after hot water treatment, the component (B) in the resin composition layer absorbs water in EVOH resin (A) to become a sulfate hydrate containing crystallization water in an amount of usually more than 70% by weight relative to that of saturated hydrate. In the specific case of magnesium sulfate, after hot water treatment, it exists in the form of 7-hydrate corresponding to a saturated hydrate of magnesium sulfate, or 6-hydrate containing crystallization water of 86% by weight based on the water amount of the saturated hydrate.

EXAMPLE

Hereinafter, the present invention is described specifically with reference to examples, but the invention is not limited thereto unless exceeding its gist.

Incidentally, "parts" in the examples are on the weight basis, unless otherwise indicated.

[Production of Resin Composition Pellet of the First Embodiment and Multilayer Structure Thereof, and Their Evaluation]

Saponified ethylene-vinyl acetate copolymer having ethylene structural unit content of 29 mol %, saponification degree of 99.7 mol %, and MFR of 4 g/10 min (210° C., load of 2160 g) was used as (A) EVOH resin. Four types of completely dehydrated polyvalent metal sulfate hydrate (i.e. magnesium sulfate anhydrous, sodium sulfate anhydrous, magnesium succinate anhydrous, and sodium pyrophosphate anhydrous) are used to prepare four composition Nos. C1-1, C1-2, C1-3, and C1-4 respectively. The magnesium sulfate anhydrous corresponds to the component (B), but the other anhydrouses do not correspond to the component (B).

90 parts of the EVOH resin was fed to a hopper equipped with a twin screw extruder (φ30 mm, L/D=43) possessing two mixing zones, and 10 parts of the above-mentioned anhydride was added to the hopper through a powder feeder, followed by melt-kneading (setting temperatures for the extruder: C1/C2/C3/C4/C5/C6/C7/H/D=200/210/230/230/230/230/230/230° C.) and extruding into a strand shape. The resultant strand was cut to obtain cylindrical pellets of respective EVOH resin composition Nos. C1-1 to C1-4.

The obtained resin composition pellets were formed into 3-kind and 5-layer multilayer film (polypropylene layer/adhesive resin layer/resin composition layer/adhesive resin layer/polypropylene layer) using co-extruding multilayer film-forming apparatus having 3-kind-5-layered feedblock, a multilayer film forming die, and a winder.

"EA6A" from Japan Polypropylene Corporation was used for the polypropylene layer, and maleic anhydride-modified polypropylene resin ("MODIC-AP P604V" from Mitsubishi Chemical Corporation) was used as the adhesive resin.

The die was set at 230° C. during extrusion, and the obtained multilayer film was cooled by a chill roll in which cooling water circulated. The obtained 3-kind and 5-layer multilayer film has thicknesses (μm) as follows: polypropylene layer/adhesive resin layer/EVOH resin composition layer/adhesive resin layer/polypropylene layer=120/20/40/20/120.

(1) Gas Barrier Property after Hot Water Treatment

After being subjected to retort treatment at 123° C. by a retort apparatus (Hisaka Works, Ltd.) for 33 minutes, sample pieces (10 cm×10 cm) of the aforementioned multilayer structure were taken out of the apparatus, and oxygen permeation (23° C., inside: 100% RH, outside: 50% RH) was measured using an oxygen permeation rate tester (OX-THAN 10/50 of MOCON). A measurement result is shown in Table 1.

The oxygen permeations of the layers other than the EVOH resin layer in the multilayer structure are extremely high, as compared with the oxygen permeation of the EVOH resin layer. Accordingly, the oxygen permeations of the other layers can be ignored in measuring the gas barrier property or oxygen blocking performance.

Referential example RC1, which was produced by feeding EVOH resin but not a metal salt and forming into a multilayer film in the same manner, was evaluated. The evaluation result is also shown in Table 1. Oxygen permeation of the multilayer film made of EVOH resin alone was 0.2 cc/m$^2$·day·atm before hot water treatment.

TABLE 1

| Composition | | Oxygen permeation (cc/m$^2$ · atm) | | | |
|---|---|---|---|---|---|
| No. | Metal salt | 5 h | 12 h | 1 day | 3 days |
| C1-1 | magnesium sulfate | 1 | 1 | 1 | 1 |
| C1-2 | sodium sulfate | 16 | 16 | 15 | 12 |
| C1-3 | magnesium succinate | 5 | 5 | 5 | 4 |
| C1-4 | sodium pyrophosphate | 5 | 5 | 4 | 4 |
| Reference RC1 | — | — | 20 | 18 | 16 |

Regarding the referential example RC1, which comprises EVOH resin but not metal salt, the gas barrier property was remarkably deteriorated by hot water treatment, and the oxygen permeation was increased to 20 cc/m$^2$·atm at 12 hours after the hot water treatment. Thus deteriorated gas barrier property can be gradually recovered by leaving the film in air atmosphere, however, the recovery speed is slow such that the oxygen permeation was as large as 16 cc/m²·atm even after a lapse of 3 days.

On the other hand, the composition No. C1-1, which comprises magnesium sulfate anhydrous as (B) a completely or partially dehydrated polyvalent metal sulfate hydrate, exhibited low oxygen permeation at only 5 hours after hot water treatment, similar to gas barrier property inherent to EVOH resin layer before hot water treatment. As can be seen from these results, a resin composition comprising magnesium sulfate anhydrous as the component (B) showed a very quick recovery of gas barrier property deteriorated by hot water treatment and maintained excellent gas barrier property after recovery.

Resin composition No. C1-3 comprising magnesium succinate anhydrous exhibited gas barrier property to some extent with a lapse of only 5 hours after hot water treatment and its gas barrier property was a little enhanced with a lapse of 3 days, however, the gas barrier property is inferior to that of resin composition comprising magnesium sulfate anhydrous.

On the other hand, oxygen permeation at 5 hours after hot water treatment of the resin composition No. C1-2 comprising sodium sulfate anhydrous was smaller than that of EVOH resin alone, but larger than that of resin composition No. C1-1 comprising magnesium sulfate anhydrous. And then, the oxygen permeation of the resin composition No. C1-2 was slowly decreased with time, but that of after 3 days was still 12 times as much as that of resin composition No. C1-1 comprising magnesium sulfate anhydrous. As can be seen from these results, sodium sulfate anhydrous slowly recovers the gas barrier property deteriorated by hot water treatment, and the recovery level is not sufficient (see No. C1-2).

Resin composition No. C1-4 comprising dehydrate sodium pyrophosphate had almost the same recovery speed and recovery level of the deteriorated gas barrier property as the resin composition No. C1-3 comprising magnesium succinate.

(2) Melt-Moldability 55 g of the above prepared resin composition pellets Nos. C1-1-C1-4 were put into a torque detection type rheometer ("Plasticoder PLE331" of Brabender, roller mixer W50E) set at a temperature of 230° C., pre-heated for 5 minutes, and subsequently, torque values (Nm) during melt-kneading at a rotation number of 50 rpm were measured with time (10 minutes, 50 minutes, 80 minutes, 100 minutes, and 120 minutes respectively after start of kneading). Measurement results are shown in Table 2. In addition, a viscosity ratio (120 min/10 min) of viscosity at 120 minutes relative to one at 10 minutes after start of kneading was calculated as degree of viscosity variation. The degree of viscosity variation of less than 1 means the viscosity decreasing, and the degree of viscosity variation of more than 1 means the viscosity increasing.

The measurement result of the reference composition pellet RC1, which corresponds to EVOH resin alone without dehydrated metal salt, is also shown in Table 2.

TABLE 2

| Composition No. | Metal salt | Melt viscosity behavior (Nm) | | | | |
| --- | --- | --- | --- | --- | --- | --- |
| | | 10 min | 50 min | 80 min | 100 min | 120 min |
| C1-1 | magnesium sulfate | 7.2 | 2.7 | 2.2 | 2.1 | 2.2 |
| C1-2 | sodium sulfate | 9.6 | 7.9 | 8.6 | 10.1 | 12.2 |
| C1-3 | magnesium succinate | 10.2 | 18.4 | 26.3 | 28.9 | 31.3 |
| C1-4 | sodium pyrophosphate | 10.2 | 10.7 | 13.6 | 16.3 | 18.5 |
| Reference RC1 | — | 10.8 | 9.5 | 9.7 | 10.3 | 11.3 |

As seen from Table 2, with respect to the resin composition No. C1-1 comprising magnesium sulfate anhydrous, the torque value was decreased for 1 hour during kneading, and became an almost constant value, which means a stable behavior in viscosity. Also, as seen from that the degree of viscosity variation is 0.3, viscosity is decreased from an early stage of melt-kneading.

On the other hand, with respect to the resin composition No. C1-2 comprising sodium sulfate anhydrous, the torque value was decreased for a period of 1 hour of kneading, but after then, the viscosity was increased and showed an unstable viscosity behavior, which is not advantageous comparing with the viscosity behavior of EVOH resin alone or reference RC1. As seen from that the degree of viscosity variation of No. C1-2 is 1.3, viscosity of No. C1-2 tends to increase from an early stage of melt-kneading.

Resin compositions No. C1-3 comprising magnesium succinate anhydrous and No. C1-4 comprising sodium pyrophosphate anhydrous had the degrees of viscosity variation of 3.1 and 1.8 respectively, both demonstrated viscosity increasing from an early stage of melt-kneading.

From the above results, it is understood that the inventive resin composition No. C1-1 exhibits a stable viscosity behavior, and can recover very quickly the gas barrier property deteriorated by hot water treatment, and has a superior recovered gas barrier property.

[Preparation of the Resin Composition of the Second Embodiment (Resin Composition Containing Polyamide-Based Resin), and Multilayer Structure Using the Same, and Their Evaluation]

(3) Melt-Moldability and Gas Barrier Property 80 parts by weight of saponified ethylene-vinyl acetate copolymer having ethylene structural unit content of 29 mol %, saponification degree of 99.7 mol %, and MFR of 4 g/10 min (210° C., load of 2160 g) as an EVOH resin, 10 parts by weight of terminal-modified 6 nylon (melting point: 220° C., terminal carboxyl group content: 20 µeq/1 g polymer) as a polyamide-based resin, and 10 parts by weight of magnesium sulfate anhydrous were dry blended to obtain resin composition No. C1-1, in which the polyamide-based resin was contained in the content of 13% by weight based on the EVOH resin. To a torque detection type rheometer ("Plasticoder PLE331" of Brabender, roller mixer: W50E) set at a temperature of 230° C., 55 g of the resin composition No. C1-1 was fed and pre-heated for 5 minutes, and subsequently, its torque value (Nm) was measured during melt-kneading at a rotation speed of 50 rpm in the same manner as the first embodiment, and its degree of viscosity variation was calculated. The measurement result is shown in Table 3.

The polyamide-based resin-containing resin composition No. 1-1 prepared above was used to produce a multilayer structure in the same manner as the first embodiment, and the obtained multilayer structure was evaluated on gas barrier property after hot water treatment. The evaluation result is shown in Table 4.

TABLE 3

| Composition No. | Resin | Metal salt | Melt viscosity behavior (Nm) | | | | |
|---|---|---|---|---|---|---|---|
| | | | 10 min | 50 min | 80 min | 100 min | 120 min |
| C2-1 | EVOH resin + polyamide resin | magnesium sulfate | 10.9 | 5.0 | 5.0 | 5.4 | 6.4 |

TABLE 4

| Composition No. | Resin | Metal salt | Oxygen permeation (cc/m² · atm) | | | |
|---|---|---|---|---|---|---|
| | | | 5 h | 12 h | 1 day | 3 days |
| C2-1 | EVOH resin + polyamide resin | magnesium sulfate | 1 | 1 | 1 | 1 |

It is known that mixture of EVOH resin with polyamide-based resin tends to increase melt viscosity, however, the composition No. 1-1 showed a decreasing tendency having 0.6 in degree of viscosity variation. Such stabilizing effect of the viscosity behavior was as good as one of the composition No. C1-1 without polyamide-based resin. Accordingly, it is seen that even if a resin such as polyamide-based resin caused to increase viscosity when melt-kneading with EVOH resin is contained in the resin composition, (B) a completely or partially dehydrated polyvalent metal sulfate hydrate could suppress increasing viscosity of the resin composition in melt-kneading, thereby making it possible to adjust viscosity behavior appropriately and improve melt-moldability.

In addition, as can be seen from Table 4, the multilayer structure using the composition No. C1-1 could recover the gas barrier property lost by hot water treatment at a relatively high speed and the recovered gas barrier property was remarkably excellent, as similar to the composition No. C1-1.

(4) Melt-Moldability of the Resin Composition Comprising Polyamide-Based Resin and Completely Dehydrated Magnesium Sulfate Hydrate The resin compositions Nos. C2-2 and C2-3 were prepared by dry blending 80 parts by weight of saponified ethylene-vinyl acetate copolymer having ethylene structural unit content of 29 mol %, saponification degree of 99.7 mol %, and MFR of 4 g/10 min (210° C., load of 2160 g) as an EVOH resin, 10 parts by weight of terminal-modified 6 nylon (melting point: 220° C., terminal carboxyl group content: 20 µeq/1 g polymer) as a polyamide-based resin, 1 part by weight of calcium stearate ("calcium stearate" manufactured by NOF CORPORATION), and 9 parts by weight of completely dehydrated magnesium sulfate having a water content shown in Table 5 respectively. The water content was measured by a thermogravimetric analyzer (TGA) Pyris 1 (PerkinElmer, Inc.) for 30 minutes at 550° C. The content of polyamide-based resin relative to EVOH resin was 13% by weight.

To a torque detection type rheometer ("Plasticoder PLE331" of Brabender, roller mixer: W50E) set at a temperature of 230° C., 55 g of the above prepared resin compositions were fed and pre-heated for 5 minutes, and subsequently, each torque value (Nm) during melt-kneading at a rotation speed of 50 rpm was measured in the same manner as the first embodiment (2), and its viscosity ratio (120 min/10 min) of viscosity of 120 min to 10 min after the start of kneading was calculated as degree of viscosity variation.

For reference, the viscosity of the resin composition RC2 was also measured. The resin composition RC2 was prepared in the same manner as the resin composition No. C2-2 except no addition of magnesium sulfate. These measurement results are shown in Table 5.

TABLE 5

| Composition No. | Water content of Magnesium sulfate (% by weight) | Melt viscosity behavior (Nm) | | | | |
|---|---|---|---|---|---|---|
| | | 10 min | 50 min | 80 min | 100 min | 120 min |
| C2-2 | 3.8 | 10.2 | 19.5 | 18.6 | 15.8 | 13.2 |
| C2-3 | 2.3 | 10.7 | 9.7 | 5.1 | 3.5 | 2.6 |
| Reference RC2 | — | 13.3 | 14.8 | 17.7 | 18.4 | 19.3 |

Although both resin composition Nos. C2-2 and C2-3 employed magnesium sulfate anhydrous, they respectively had 3.8% and 2.3% by weight in water content measured by a thermalgravimetric analyzer. May be this is because crystallization water of magnesium sulfate hydrate was completely removed once but the completely dehydrated product might have absorbed moisture during storage and resulted in such small amount of water content. Nevertheless, both resin composition could show viscosity decreasing. On the other hand, the reference composition RC2 without magnesium sulfate showed viscosity increasing due to addition of polyamide-based resin. From these results, it is understood that even if the magnesium sulfate anhydrous contains small amount of water due to water absorption in storage, the magnesium sulfate anhydrous could suppress and/or prevent viscosity increasing caused by addition of polyamide resin. Additionally, it is expected that not only completely dehydrated product but also partially dehydrated product could contribute an effect of stabilizing viscosity.

From the comparison between No. C2-2 and C2-3, No. C2-3 having smaller water content had a smaller degree of viscosity variation. It is understood that the smaller water content the dehydrated product has, the larger effect of suppressing viscosity increase by dehydrated polyvalent metal sulfate hydrate is given in an EVOH resin composition, in particular, a resin composition containing polyamide-based resin.

[Preparation of Pellet of the Third Embodiment of Resin Composition (Plate-Like Inorganic Filler-Containing Resin Composition) and Multilayer Structure Using the Same, and Their Evaluation]

80 parts by weight of saponified ethylene-vinyl acetate copolymer having ethylene structural unit content of 29 mol %, saponification degree of 99.7 mol %, and MFR of 4 g/10 min (210° C., load of 2160 g) as an EVOH resin, 10 parts by weight (corresponding to 13% by weight based on the EVOH resin) of calcined kaolin (supplied by Imeris) as a plate-like inorganic filler, and 10 parts by weight of magnesium sulfate anhydrous were dry blended to prepare resin composition No. C1-1. The resin composition No. C1-1 was used to produce a multilayer structure, and the obtained multilayer structure was evaluated on the gas barrier property during a period from 10 days to 16 days after starting hot water treatment in the same manner as the first embodiment.

For references, multilayer structures produced by use of the resin composition C1-1 without plate-like inorganic filler, reference resin composition RC1, and reference resin composition RC3 comprising an EVOH resin and kaolin but not magnesium sulfate were evaluated on their gas barrier properties in the same manner as No. C3-1. These results are shown in Table 6.

TABLE 6

| Composition No. | Constituent of EVOH layer | Oxygen permeation (cc/m2 · atm) | | | |
|---|---|---|---|---|---|
| | | 10 days | 12 days | 14 days | 16 days |
| C3-1 | EVOH + magnesium sulfate + kaolin | 0.6 | 0.6 | 0.6 | 0.6 |
| C1-1 | EVOH + magnesium sulfate | 0.8 | 0.8 | 0.8 | 0.7 |
| Reference RC1 | EVOH | 11.6 | 10.2 | 9.2 | 7.1 |
| Reference RC3 | EVOH + kaolin | 13.1 | 9.5 | 8.7 | 7.1 |

As shown in Table 6, every resin composition had oxygen permeation at 10 days after less than that of at 3 days after (refer to Table 1), which was supposed to be a drying effect of the resin composition layer.

From the comparison between No. C1-1 and C1-1, No. C1-1 had oxygen permeation of 0.6 cc/m$^2$·atm at 10 days after as well as that of 16 days after, while No. C1-1 had oxygen permeation of 0.7 cc/m$^2$·atm (lower than that of No. C1-1) at 16 days after. These results show that composition (C1-1) comprising plate-like inorganic filler had a little higher drying effect and superior gas barrier property.

On the other hand, as seen from the comparison between reference resin compositions RC1 and RC3, advantageous gas barrier property was not obtained by addition of plate-like inorganic filler in the absence of magnesium sulfate. Accordingly, it is understood that an improvement of gas barrier property by addition of platelike inorganic filler might be a synergy effect by the presence of magnesium sulfate.

[Relationship of Type of Layer Laid on at Least One of Both Outer Sides of the Resin Composition Layer, and Gas Barrier Property]

A 3-kind and 5-layer multilayer film was produced using pellets of the EVOH resin composition No. C1-1 prepared above in the same manner as the first embodiment including use of co-extruding multilayer film-forming apparatus, extruding condition and thicknesses of the multilayer structure produced, except that the adhesive resin was changed to the maleic anhydride-modified polycyclic olefin. The produced multilayer film is S2 (PP(EA6A) layer/maleic anhydride-modified polycyclic olefin layer/EVOH layer/maleic anhydride-modified polycyclic olefin layer/PP(EA6A)) layer. The maleic anhydride-modified polycyclic olefin was obtained by molding TOPAS 6013F-04 available from Topas Advanced Polymers GmbH with maleic anhydride by the following process.

Production of Pellet of Maleic Anhydride-Modified Polycyclic Olefin-Based Resin:

99 parts of ethylene-norbornene copolymer "TOPAS 6013F-04" manufactured by Topas Advanced Polymers GmbH (density: 1020 kg/m$^3$ (based on ISO1183), MFR: 0.9 g/10 min (load of 2160 g, 230° C.), Tg: 138° C. (based on ISO11357-1, -2, and -3)) as a polycyclic olefin-based resin and 1 part of maleic anhydride (Wako Pure Chemical Industries, Ltd., special grade reagent (melting point: 53° C.)) were dry blended, and the obtained mixture was fed to a single screw extruder and melt-kneaded in the following condition, and subsequently, extruded in a strand form and the strand was cut, thereby obtaining pellets of maleic anhydride-modified ethylene-norbornene copolymer.

extruder: Φ40 mm
L/D: 28
screenpack: 90/150/90 (mesh)
cell temperature: C1/C2/C3/C4/H/D=220/250/260/260/260/260 (° C.)
rotation number: 20 rpm The gas barrier property of the produced multilayer film S2 was measured in the same manner as the first embodiment, and the measurement value was shown in Table 7. For comparison, the measurement value of the gas barrier property of the multilayer film S1, which was a multilayer structure of the first embodiment using the EVOH resin composition (C1-1) as an intermediate layer, was also shown in Table 7.

In addition, gas barrier properties of the reference multilayer films RS1 and RS2 were measured. The RS1 employed EVOH resin without magnesium sulfate (i.e. composition RC1) as the intermediate layer and maleic anhydride-modified polypropylene (same type as one used in S1) as the adhesive resin. The RS2 employed maleic anhydride-modified polycyclic olefin as the adhesive resin. The measurement results were shown in Table 7.

TABLE 7

| Multilayer structure No. | Constituent of EVOH layer (composition No.) | Adhesive resin layer | Oxygen permeation (cc/m$^2$ · atm) | | | |
|---|---|---|---|---|---|---|
| | | | 5 h | 12 h | 1 day | 3 days |
| S1 | EVOH + magnesium sulfate (C1-1) | maleic anhydride-modified polypropylene | 1.4 | 1.2 | 1.1 | 0.9 |
| S2 | EVOH + magnesium sulfate (C1-1) | maleic anhydride-modified ethylene-norbornene copolymer | 0.7 | 0.6 | 0.4 | 0.3 |
| Reference RS1 | EVOH (RC1) | maleic anhydride-modified polypropylene | — | 20.3 | 18.4 | 16.3 |
| Reference RS2 | EVOH (RC1) | maleic anhydride-modified ethylene-norbornene copolymer | 6.0 | 5.8 | 5.2 | 4.2 |

From the comparison between the multilayer films S1 and S2, S2 had superior gas barrier property. With respect to a sandwich type multilayer structure according to this embodiment, where adhesive resin layers are laid on both outer sides of the EVOH resin composition layer, since maleic anhydride-modified polycyclic olefin had higher hydrophobicity than maleic anhydride-modified polypropylene, the advantageous drying effect of magnesium sulfate could be obtained in S2 due to low moisture absorption from outside. As a result, S2 could recover gas barrier property after the lapse of 3 days to the level almost equal to one inherent to EVOH resin (the oxygen permeation of 0.2 cc/m$^2$·day·atm before hot water treatment).

With respect to the reference multilayer structure RS2, drying effect of EVOH resin itself was not obtained due to the absence of magnesium sulfate, and the effect of preventing water permeation by maleic anhydride-modified polycyclic olefin was merely obtained. Therefore, although the gas barrier property was enhanced little by little with time by drying in air atmosphere, the oxygen permeation was as low as 4.2 cc/m$^2$·atm even after the lapse of 3 days, which was insufficient level in gas barrier property.

INDUSTRIAL APPLICABILITY

The resin composition of the invention can suppress increasing viscosity in melt-kneading EVOH resin, and therefore exhibit superior melt-moldability. The multilayer structure comprising a layer of the resin composition can recover gas barrier property inherent to EVOH resin quickly even if the gas barrier property is lost by hot water treatment. Accordingly, the multilayer structure is suitable for packaging material to be subjected to hot water treatment, particularly packaging material for goods to be subjected to retort treatment.

The invention claimed is:

1. A resin composition comprising (A) a saponified ethylene-vinyl ester copolymer, (B) a completely dehydrated magnesium sulfate, and a polyamide resin,
    wherein the content ratio (B/A) of component (B) to component (A) is in the range of 50/50 to 1/99 in terms of weight ratio, and
    wherein the amount of the polyamide resin is 1 to 30% by weight based on the weight of component (A).

2. The resin composition according to claim 1, wherein the polyamide resin is a terminal-modified polyamide resin.

3. The resin composition according to claim 1, further comprising a plate inorganic filler.

4. A multilayer structure comprising at least one layer of a resin composition comprising (A) a saponified ethylene-vinyl ester copolymer, (B) a completely dehydrated magnesium sulfate, and a polyamide resin,
    wherein the content ratio (B/A) of component (B) to component (A) is in the range of 50/50 to 1/99 in terms of weight ratio, and
    wherein the content of the polyamide resin is 1 to 30% by weight based on the weight of component (A).

5. A multilayer structure according to claim 4, further comprising layers containing a hydrophobic thermoplastic resin, the said layers being provided on both sides of the layer of the resin composition.

6. The multilayer structure according to claim 4, having a thickness of 10 to 5000 μm.

7. The multilayer structure according to claim 4, in a packaging material to be subjected to hot water treatment.

8. A method for producing a resin composition pellet comprising melt-mixing (A) a saponified ethylene-vinyl ester copolymer with (B) a completely dehydrated magnesium sulfate, and a polyamide resin
    wherein the content ratio (B/A) of component (B) to component (A) is in the range of 50/50 to 1/99 in terms of weight ratio, and
    wherein the amount of the polyamide resin is 1 to 30% by weight based on the weight of component (A).

9. A method for producing a melt-molded article comprising:
    melting a resin composition comprising (A) a saponified ethylene-vinyl ester copolymer, (B) a completely dehydrated magnesium sulfate, and a polyamide resin, and
    forming into a molded article of the resin composition,
    wherein the content ratio (B/A) of component (B) to component (A) is in the range of 50/50 to 1/99 in terms of weight ratio, and
    wherein the amount of the polyamide resin is 1 to 30% by weight based on the weight of component (A).

10. The multilayer structure according to claim 5, having a thickness of 10 to 5000 μm.

11. The multilayer structure according to claim 5, in a packaging material to be subjected to hot water treatment.

12. The method according to claim 8, wherein the melt-mixing is performed while suppressing a viscosity increase of the resin composition.

13. The method according to claim 9, wherein the melting is performed under suppressing a viscosity increase of the resin composition.

* * * * *